C. McCULLOUGH.
BALED HAY CONVEYER AND ELEVATOR.
APPLICATION FILED SEPT. 13, 1912.
1,108,599.
Patented Aug. 25, 1914.
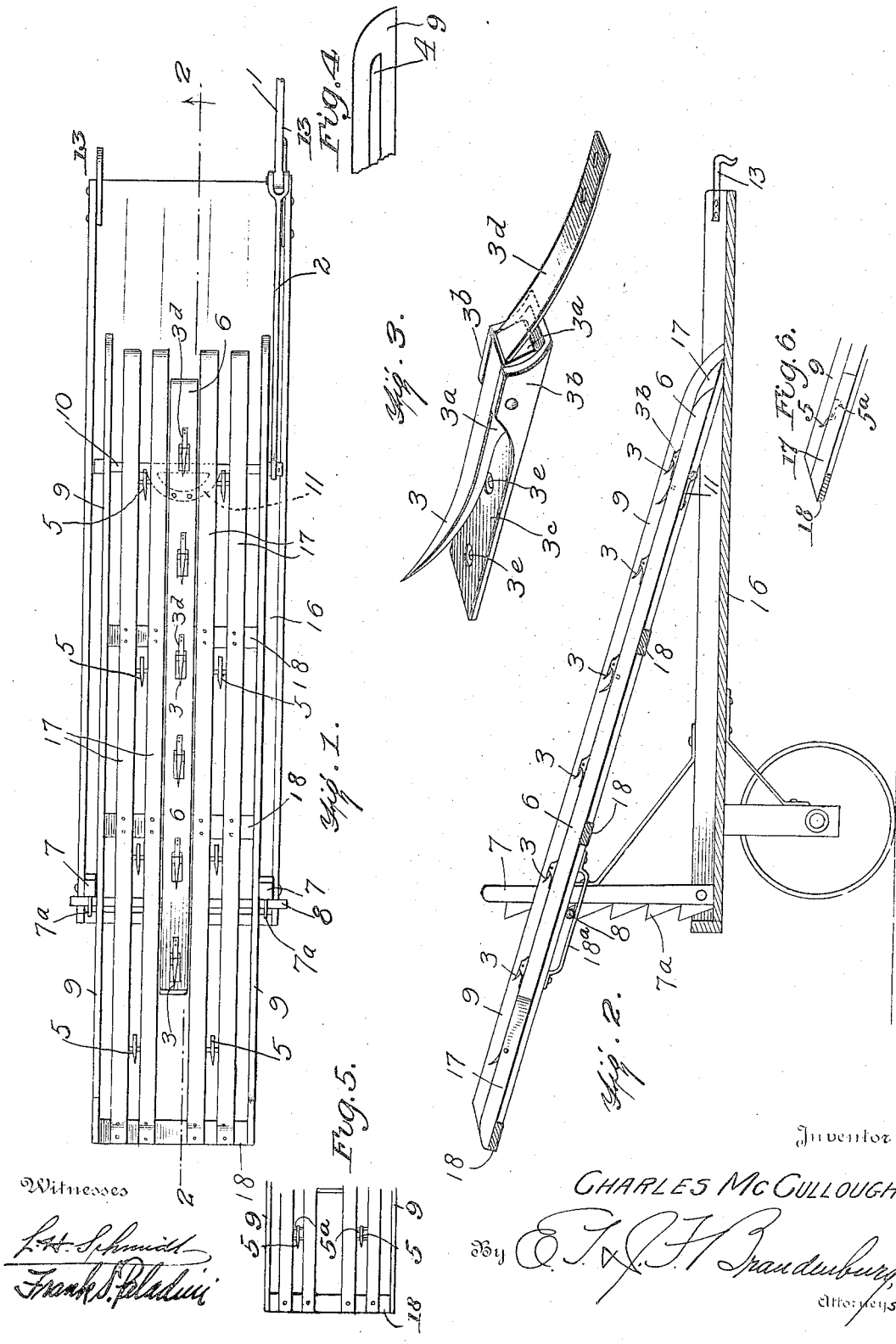
Witnesses
Inventor
CHARLES McCULLOUGH.
By Brandenburg
Attorneys

UNITED STATES PATENT OFFICE.

CHARLES McCULLOUGH, OF HAINES, OREGON.

BALED-HAY CONVEYER AND ELEVATOR.

1,108,599.  Specification of Letters Patent.  Patented Aug. 25, 1914.

Application filed September 13, 1912. Serial No. 720,196.

*To all whom it may concern:*

Be it known that I, CHARLES McCUL-LOUGH, a citizen of the United States, residing at Haines, in the county of Baker and State of Oregon, have invented new and useful Improvements in Baled-Hay Conveyers and Elevators, of which the following is a specification.

The principal object of this invention is to provide a baled hay conveyer and elevator which will be susceptible of use in connection with the ordinary hay-press, and which may be readily attachable thereto, or detachable therefrom.

My conveyer and elevator is run by the power of the hay-press, requiring no separate or independent power or agency for its operation.

A further object is to provide a device of this character which will be simple of construction, and thoroughly efficient and durable in use and operation.

With these objects in view, the invention resides in the novel construction, combination, and arrangement of parts, as will be hereinafter fully described in the specification, summed up in the claim, and illustrated in the drawing, in which:

Figure 1 is a top plan view of a hay-elevator embodying my improvements; Fig. 2 is a longitudinal vertical section, on the line 2—2, Fig. 1; Fig. 3 is a detached perspective detail view of one of the spring-pressed dogs; and Fig. 4 is a fragmentary detail view of one of the side bars of the frame of the elevator. Figs. 5 and 6 are fragmentary detail views of the runway.

Referring, now, in detail to the drawing: My device preferably includes a wheeled carrier-frame 16, which is, essentially, a platform of any suitable dimensions. When being transported over the ground, from place to place, this carrier-frame may be coupled, at its front end, to the rear end of the hay-press (not shown), in any suitable manner. Said carrier-frame is desirably provided, at its rear end, with hooks 13, which are engaged with the hay-press when the conveyer and elevator is in operation in connection with the hay-press. The front end of the carrier-frame carries two upright posts 7, 7, each provided with a vertical series of steps 7ª, any one of which may be engaged by a roller 8, for supporting the elevator proper (as hereinafter more particularly described).

The elevator proper consists of a runway carried by the carrier frame 16, and formed as an elongated platform, comprising, preferably, a plurality of spaced, longitudinally-extending timbers 17, 17, 17, 17, connected by a plurality of transverse bracing-bars 18, 18, 18. Two longitudinally-extending side-bars 9, 9 are disposed vertically, and are suitably secured to the two end timbers 17, and serve to hold the hay-bales on the elevator, against sidewise displacement.

The elevator-runway carries, on its bottom, ways or guides 18ª, in which the roller 8 is slidable, in a direction longitudinally of the runway. Reciprocable in a direction longitudinally of the runway is a plunger 6, movable between two of the timbers 17, 17, and operable by the hay-press, through suitable intermediate connections, which may take various forms, but, in this instance, comprise the following instrumentalities: Suitably secured transversely of the plunger 6 is a bar 10 movable in longitudinally-extending slots 4 in the side bars 9, 9 of the runway-frame. Pivotally connected with one end of said bar 10 is one end of a pitman 2, the other end whereof is pivotally connected with the plunger 1 of the hay-press. The bar 10 is preferably braced, at its point of connection with the plunger 6, by suitable means, such as a semi-circular, metallic ring 11.

Carried by the plunger 6, on the upper side thereof, is a longitudinally-disposed series of metallic dogs 3. These dogs are, preferably, of peculiar construction and secured in a peculiar manner to the plunger 6, as will now appear: Each dog comprises a finger gradually upwardly-curved toward one end thereof, and having, at its other end, a foot 3ª pivotally mounted in vertical side ears 3ᵇ carried by a plate 3ᶜ detachably secured to the plunger 6, as by screws or the like, passing through apertures 3ᵉ, provided therefor, in said plate. Bearing upon the rear face of the foot 3ª is one end of a leaf-spring 3ᵈ secured, at its other end, to the plunger 6, the spring operating to maintain the dog normally in elevated position.

In operation, while the plunger 6 is on its outward or forward push or stroke, the dogs 3 engage the hay-bales, the spring 3ᵈ maintaining the dogs in elevated position; but, when the plunger 6 begins its backward stroke, the dogs 3 automatically release themselves from the hay-bales, against the action of the springs 3ᵈ. A desirable and advantageous feature of my invention is the fact that the dogs 3 may readily be removed from the plunger by simply unscrewing the screws. Coöperating with the dogs 3 are two series of what I term check-dogs 5. A series of these dogs are longitudinally disposed, on pivots, between each pair of timbers 17, 17, on either side of the plunger 6. These dogs are not provided with springs, but are weighted, at their lower ends, so as to lie, normally, with their upper, pointed extremities projecting above the plane of the timber 17. These dogs are held, as against movement from the normal, in one direction, by any suitable means such as stop-pins 5ᵃ; but, as the hay-bales move upward on the run-way, they swing, on their pivots, in the other direction, so as to occupy a horizontal position. As soon, however, as the plunger 6 begins its backward stroke, when the hay-bales have a tendency, of course, to slide backward, said dogs 5 resume their normal, vertical position and, digging into the hay-bales, check and stop any backward sliding movement thereof.

By my invention, hay-bales may be elevated to a height of at least sixteen feet, the elevator and conveyer throwing the bales either onto a wagon, or onto a stack, by means of the power of the hay-press alone, thereby saving the labor and expense of an elevator operated by a power independent of the hay-press. My mechanism saves the expense and labor of men whose services would otherwise be required in conveying the hay from the press and lifting it onto the wagons or stacks, or the like. As will, of course, be understood, the plunger 6, by a series of strokes, causes the bales to be elevated in the runway.

Having thus fully described my invention, what I claim as new and desire to secure by Letters Patent of the United States is:

The combination, in a baled hay elevator, of a runway, a plunger associated with said runway and reciprocable longitudinally thereof, apertured plates disposed on the upper surface of said runway, fastening means passing through said apertures and removably securing said plates to said plunger, dogs pivoted to said plates, springs carried by said plunger and operatively associated with said dogs and maintaining them in position to engage the hay-bales as the plunger reciprocates forward, and returning said dogs to normal position after depression thereof, and means for automatically engaging the hay-bales after release thereof by said dogs, on the return stroke of the plunger.

CHAS. McCULLOUGH.

Witnesses:
L. R. STOCKMAN,
EARLE F. CRANSTON.